FLUID LUBRICATED MAGNETIC TAPE TRANSDUCER

ROY T. NAKAI &
JOSEPH T. MA
INVENTORS

BY Robert G. Clay
ATTORNEY

FLUID LUBRICATED MAGNETIC TAPE TRANSDUCER

ROY T. NAKAI &
JOSEPH T. MA
INVENTORS

BY Robert G. Clay

ATTORNEY

ROY T. NAKAI &
JOSEPH T. MA
INVENTORS

BY Robert G. Clay

ATTORNEY

ROY T. NAKAI &
JOSEPH T. MA
INVENTORS

BY Robert G. Clay

ATTORNEY

ROY T. NAKAI &
JOSEPH T. MA
INVENTORS

BY Robert G. Clay
ATTORNEY

ROY T. NAKAI &
JOSEPH T. MA
INVENTORS

BY Robert G. Clay
ATTORNEY

ROY T. NAKAI &
JOSEPH T. MA
INVENTORS

BY Robert G. Clay

ATTORNEY

United States Patent Office 3,435,442
Patented Mar. 25, 1969

3,435,442
FLUID LUBRICATED MAGNETIC TAPE TRANSDUCER

Joseph T. Ma, Los Gatos, and Roy T. Nakai, Mountain View, Calif., assignors to Ampex Corporation, Redwood City, Calif., a corporation of California Filed Mar. 26, 1965, Ser. No. 442,860
Int. Cl. G11b *9/02*
U.S. Cl. 340—174.1 8 Claims

ABSTRACT OF THE DISCLOSURE

An air bearing is provided for magnetic tape moving across a magnetic transducing head. The head-to-tape spacing or air-film thickness is a function of the tape tension and radius of curvature of the head bearing surface, and is rendered adjustable by means of a recess formed in the surface upstream from the transducing gap, the recess being coupled to a variable pressure source for controlling the pressure in the groove such that this pressure, though variable, is always greater than the pressure downstream from the groove. Pressurized grooves paralleling the edges of the tape are also provided to counteract lateral leakage of air.

This invention relates to fluid lubricated magnetic tape transducers, and particularly to such transducers providing a fluid film of controllable thickness.

In the magnetic tape recording and reproducing art, it is usual to move a tensioned foil or tape across a magnetic transducer and in pressurized contact therewith to secure the smallest possible spacing between the transducer and the magnetic oxide coating of the tape, the strength of the recorded or reproduced signal being an inverse function of this spacing. However, such physical contact causes frictional wear of the expensive transducer surfaces, gradually changing their operating characteristics, which alone is undesirable, and eventually causing failure of the transducers, often within a few thousand hours of use. The friction also wears the tape oxide, causing increasing loss of information and eventual destruction.

To overcome this problem it has been proposed to lubricate the tape at the transducer head by means of self-acting air bearing such as have been previously used to reduce the wear of tape in passage over various guide posts of a transport. In such bearings, the moving tape itself drags air into and compresses it into a "film" in the region between the tape and the bearing post or transducer. The film thickness or spacing $h$ that results between the tape and transducer of course reduces the strength of the signal, but not to an intolerable degree. However, the spacing $h$ is a function of various transport and tape parameters, such as head radius of curvature, tape speed and tension, and the characteristics of the particular piece of tape being used. If one is limited to certain combinations of such parameters and characteristics for reasons that have nothing to do with the head bearing, then one has only a correspondingly limited freedom to establish the spacing $h$ at a desired value. Furthermore, flutter variations of tape tension and speed occur in all transports, and so long as the spacing $h$ is a function of these parameters, it must inhert their inaccuracies. All considerations, therefore, urge that the spacing $h$ be controllable independently of, or in a way that is not exclusively dependent on, tape tension and speed, and individual tape and head characteristics. This object is not attainable with the self-acting air bearings known in the art.

The air-bearing guide post art, previously mentioned, also includes "externally-pressurized" bearings in which sources of pressurized air are coupled to provide an air and pressure supply for the bearing region in addition to the air and pressure supply created by the "self-acting" effect. In principle, control of the external pressure source would provide the desired independent control of the tape-to-bearing spacing $h$. However, the guide post art was concerned only with the problem of providing air bearings in the broadest sense, and not with the problem of maintaining a minimum and stable spacing $h$, at a particular point such as a transducer head gap. For example, the guide post art teaches the use of porous metal surfaces for the emission of pressurized air, and jets of various types. But when such structure is to be applied to a head bearing, many questions arise. Where are the air-emitting elements to be placed in relation to the head gaps? How is the pressure to be controlled or varied? It is to such problems as these that the present invention is addressed.

Accordingly, it is an object of the present invention to provide a gas bearing for lubricating a tape in passage across a transducing head.

It is a further object of this invention to provide, in such a bearing, means for varying the head-to-tape spacing while maintaining predetermined tape characteristics, speed and tension.

It is a further object to provide, in such a bearing, means for establishing and stably maintaining a head-to-tape spacing of a predetermined value despite changes in tape characteristics, speed and tension.

It is a further object of this invention to provide, in an externally pressurized bearing, means for varying the head-to-tape spacing while maintaining a predetermined supply pressure to the bearing.

It is a further object of the invention to reduce the effects of tape speed and tension changes on the head-to-tape spacing of an externally pressurized bearing, while maintaining a predetermined supply pressure to the bearing.

It is a further object of this invention to provide a bearing as above described and requiring a minimum number of structural features and manufacturing operations.

These and other objects are achieved in a bearing having air passages opening in the bearing surface at a point upstream from the transducer head gap in relation to the direction of tape motion, and means coupled to the passages for controlling the flow of air beneath the tape at the openings. Such means may take the form of an external pressure source or a restrictor in the passage, used either separately or in combination.

A better understanding of the invention may be had by reference to the following description, taken in conjunction with the accompanying drawings, in which.

Figure 1:
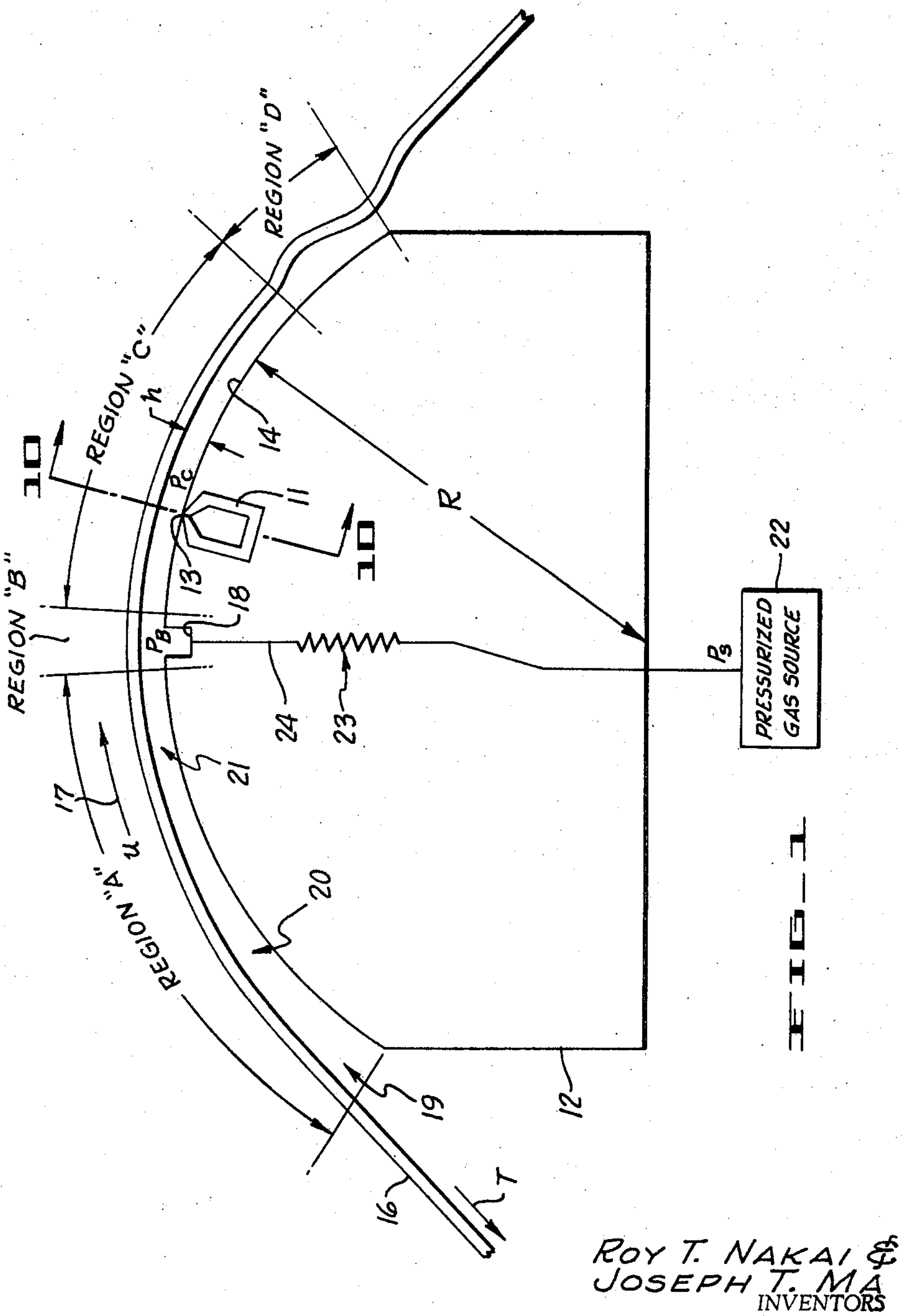
FIGURE 1 is a schematic view of a bearing in accordance with the invention.

Referring now to FIGURE 1, there is schematically shown a gas bearing structure in accordance with the present invention. A magnetic transducer 11 is mounted in a head or bearing block 12, with the transducing gap 13 lying on and facing outward from a salient or convexly curved bearing surface 14 of the block. The surface 14 has a radius R. A magnetic tape 16 in the form of a flexible or semi-flexible foil is arranged to confront the surface 14 and is tensioned to generally conform thereto and is moved around the curve of the surface 14 in the direction indicated by arrow 17. The tension in the tape is indicated by arrows T and the velocity by the letter U. The tape tensioning and moving means are not shown in this figure, but may be any means known in the art, such as capstans, pinch rollers and braked or driven reels. Upstream from the transducer 11 (with relation to the direction of motion 17 of the tape) there is provided a control groove, recess or concavity 18 extending transversely to the direction of motion of the tape and having a length somewhat less than the width of the tape.

Before proceeding with further description of the structure shown in FIGURE 1, it will be of advantage to examine the basic operation of the elements thus far described. This structure when operating has certain well-defined regions A, B, C and D as shown, in which various effects take place. In region A a self-acting air bearing is established. The tape 16, approaching a point of tangency with the surface 14, frictionally entrains air from the surrounding atmosphere and compresses it in the narrowing, funnel-shaped entrance region 19 to form a bearing "film" of gas. Some variation takes place in the thickness of the film and of the spacing between the tape and surface 14 as the tape proceeds in a downstream direction and begins to conform to the curvature of the surface 14, as shown in region 20. However, eventually the air film becomes of constant pressure and thickness, and remains so as it moves downstream as shown in region 21, so long as the radius of curvature does not change. This constant thickness region is characteristic of self-acting foil bearings, and is established and maintained substantially despite lateral leakage of air from the edges of the tape, for the following reasons. Since the amount of entrained air is very small, the thickness of the air film is also quite small (e.g., 50 micro-inches) in relation to the dimensions of the tape segment that is supported by the air film and the block 12 (e.g., 1 inch wide by 2 inches long), so that in effect the volume of space between the tape and block 12 constitutes a restricted passage for the air. If the apparatus is viewed in cross-section (i.e., transverse to the direction of motion), it will be seen that the tape and block 12 define a restricted passage having a length (1 inch) on the order of 20,000 times the height (50 micro-inches). The impedance of this passage to lateral flow and leakage of the air is so great that such lateral leakage as there may be has substantially no effect in reducing the film thickness over most of the width of the tape, and substantially all of the pressurized air flows on through regions B and C and out of the bearing in the diverging exit region D where the tape becomes unstable. If it were not for the presence of the groove 18 in the present example, the region 21 of constant film thickness would extend through regions B and C. However, in the present structure the groove 18 constitutes a discontinuity in the surface 14 that alters the flow of the air in region B, and in effect establishes the beginning of a secondary self-acting bearing, resulting in a second region C of constant film thickness $h$. As disclosed in concurrently-filed U.S. patent application No. 442,859 entitled, "Fluid Lubricated Magnetic Tape Transducer" by Alfred F. Stahler, the dimensions and shape of the groove 18 may be varied to assist in controlling the film thickness $h$ in region C, where the transducer gap 11 is located. However such control is best exercised as part of the manufacturing process, and further means are needed for altering the flow of air at the groove 18 to control the downstream film thickness $h$ during actual operation of the apparatus.

This further means is shown in FIGURE 1 as including a pressurized gas source 22 coupled through a restrictor 23 and a passage 24 to the bottom of the groove 18. The source 22 may be adjustable to supply any predetermined pressure $P_S$ to the restrictor 23 and this pressure may be established at such a value that the pressure $P_B$ in the groove is either greater or less than the pressure $P_C=T/R$ under the tape in region C. If $P_S$ is greater than $P_B$ and $P_B$ is greater than $P_C$, there is flow of air from the source 22 into the groove 18, increasing the quantity of air flowing into region C and increasing the film thickness $h$ downstream from the groove. Under these circumstances the film thickness $h$ in region C may become somewhat unstable. However an extremely stable value of $h$ can be obtained by setting the pressure $P_S$ low enough to cause a flow of air out of the groove 18 and toward the source 22. In such an arrangement, the air flow into the groove from region A is divided, part being diverted toward the source 22 and part being carried on to region C. Since the quantity of air supplied to region C is thus reduced, the film thickness $h$ is correspondingly reduced, to a controllable degree dependent on the setting of pressure $P_S$.

It will be understood that diversion of some of the air out of the bearing by the source 22 is but one condition under which stability and control may be achieved, and that such stability and control may also be obtained under some circumstances by causing flow into the bearing from the pressure source. The essential condition for stability is the relationship established by this flow in the values of $P_B$ and $P_C$, i.e., the pressure in the groove and the pressure under the tape in region C downstream. So long as $P_B$ is equal to or less than $P_C$, the value of $h$ in region C is stable; but when $P_B$ is greater than $P_C$, the value of $h$ in region "C" is to some degree unstable. This phenomenon, among others, is illustrated by the following figures.

Figure 3:
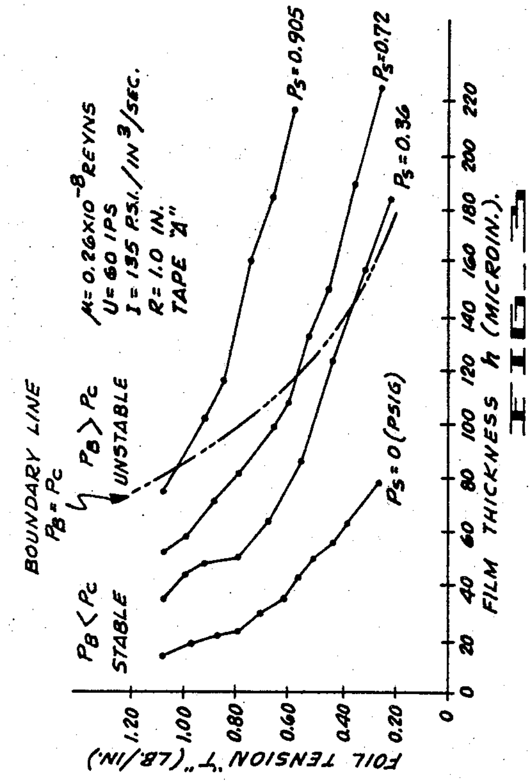
FIGURE 3 is a chart illustrating the operation of the invention.
Figure 2:
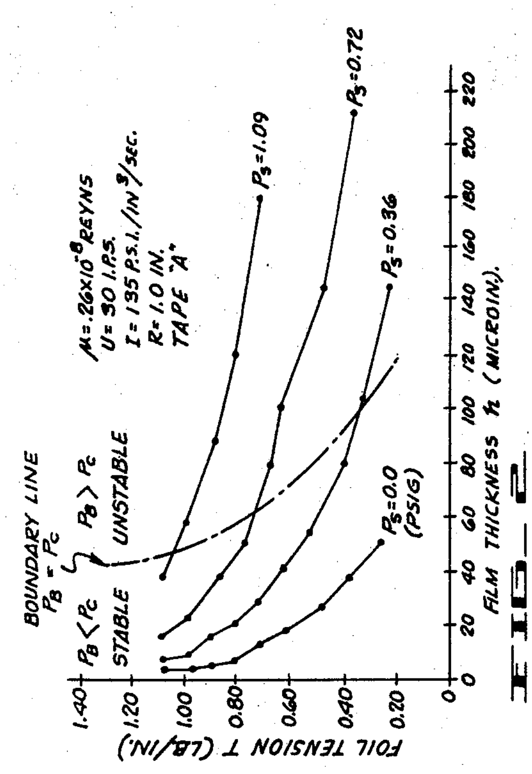
FIGURE 2 is a chart illustrating the operation of the invention.
Figure 4:
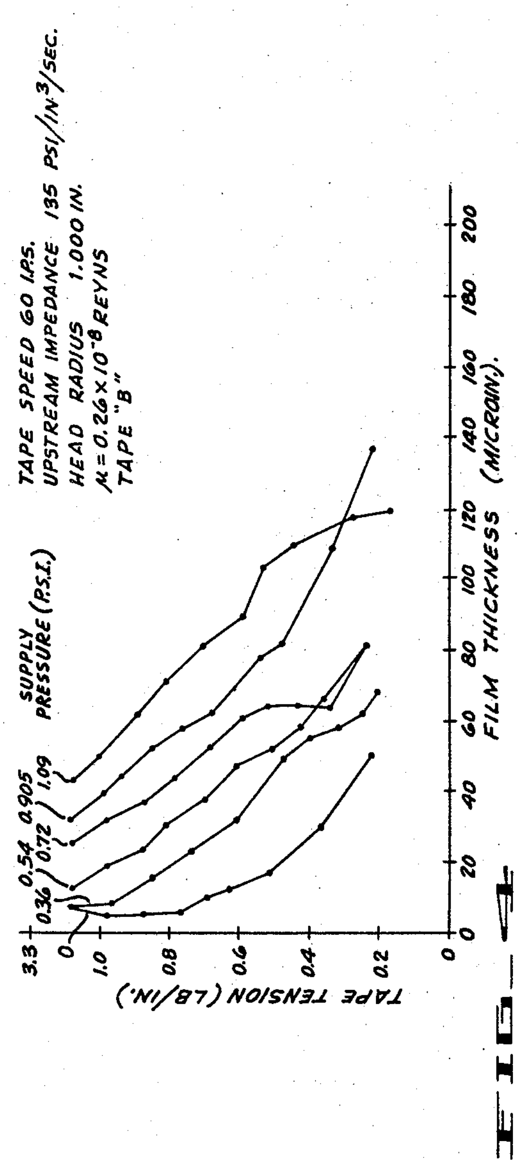
FIGURE 4 is a chart illustrating the operation of the invention.

FIGURES 2–4 illustrate the actual performance of an apparatus constructed and operated as above described. In FIGURES 2 and 3 the apparatus was operated at $U=30$ inches per second and $U=60$ i.p.s. respectively, using the same tape A. It is clear from these figures that the same film thickness $h$ may be obtained at both speeds merely by changing the source or reference pressure $P_S$. For example, with tape tension T established at 1.00 lb./in., a film thickness $h$ of 40 micro-inches can be obtained at $U=30$ i.p.s. with a source pressure $P_S$ of approximately 0.90 lb./in.$^2$ gauge, and at 60 i.p.s. with a $P_S$ of approximately 0.36 lb./in.$^2$ gauge. FIGURES 3 and 4 illustrate the same apparatus operated at 60 i.p.s. with tapes A and B made by different manufacturers. It is clear that the same film thickness $h$ may be obtained with both tapes merely by changing the source pressure $P_S$. For example, with the same tension T of 1.00 lb./in., tape B may also be operated at the same 40 micro-inches film thickness with a source pressure $P_S$ of approximately 0.90 lb./in.$^2$ gauge.

Figure 6:
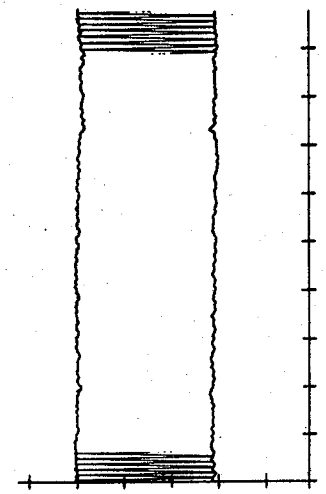
FIGURE 6 is a tracing of an oscilloscope display illustrating the operation of the invention.
Figure 5:
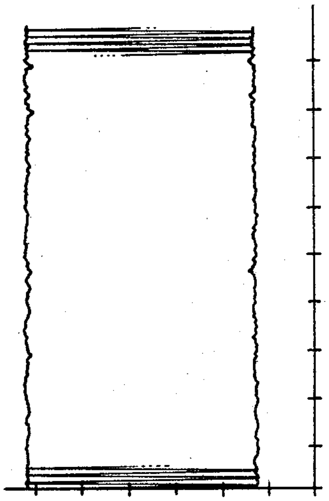
FIGURE 5 is a tracing of an oscilloscope display illustrating the operation of the invention.

FIGURES 5 and 6 are tracings of the envelopes of oscilloscope displays of a 50 kc. signal reproduced from a tape in contact with the head (FIGURE 5) and with a 50 micro-inch spacing or film thickness $h$ (FIGURE 6) produced by apparatus as above described. The amplitude of the signal with air spacing is less than when the tape is in contact, as would be expected. However, the envelopes in both figures are equally smooth, indicating that the air film bearing is equally as stable as the frictional bearing.

Figure 8:
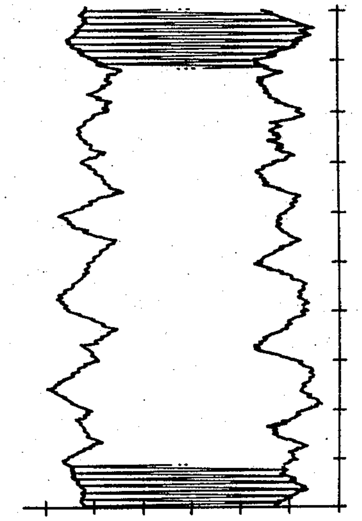
FIGURE 8 is a tracing of an oscilloscope display illustrating the operation of the invention.
Figure 7:
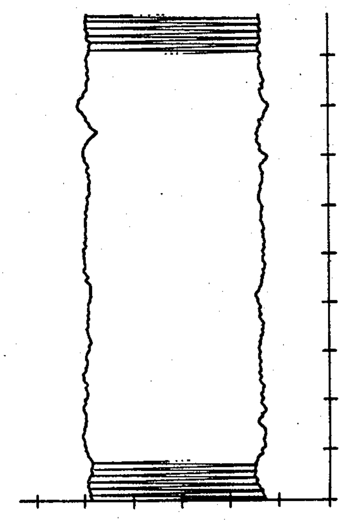
FIGURE 7 is a tracing of an oscilloscope display illustrating the operation of the invention.

In plotting FIGURES 2 and 3, values of $P_B$ and $P_C$ were also experimentally measured and lines representing the boundary $P_B=P_C$ are plotted. In the area to the left of the boundary line, $P_B$ is everywhere less than $P_C$ and the film thickness $h$ is stable, as illustrated in FIGURE 7, which is a tracing similar to that of FIGURE 6 of an oscilloscope display of a 50 kc. signal reproduced at 30 i.p.s. with the air bearing of the invention, and with $P_B$ less than $P_C$. In the area to the right of the boundary line $P_B=P_C$ (FIGURES 2 and 3), $P_B$ is everywhere greater than $P_C$, and the film thickness $h$ is unstable, as illustrated in FIGURE 8, which is a tracing of an oscilloscope display of the signal of FIGURE 7 when $P_B$ is greater than $P_C$.

Figure 9:
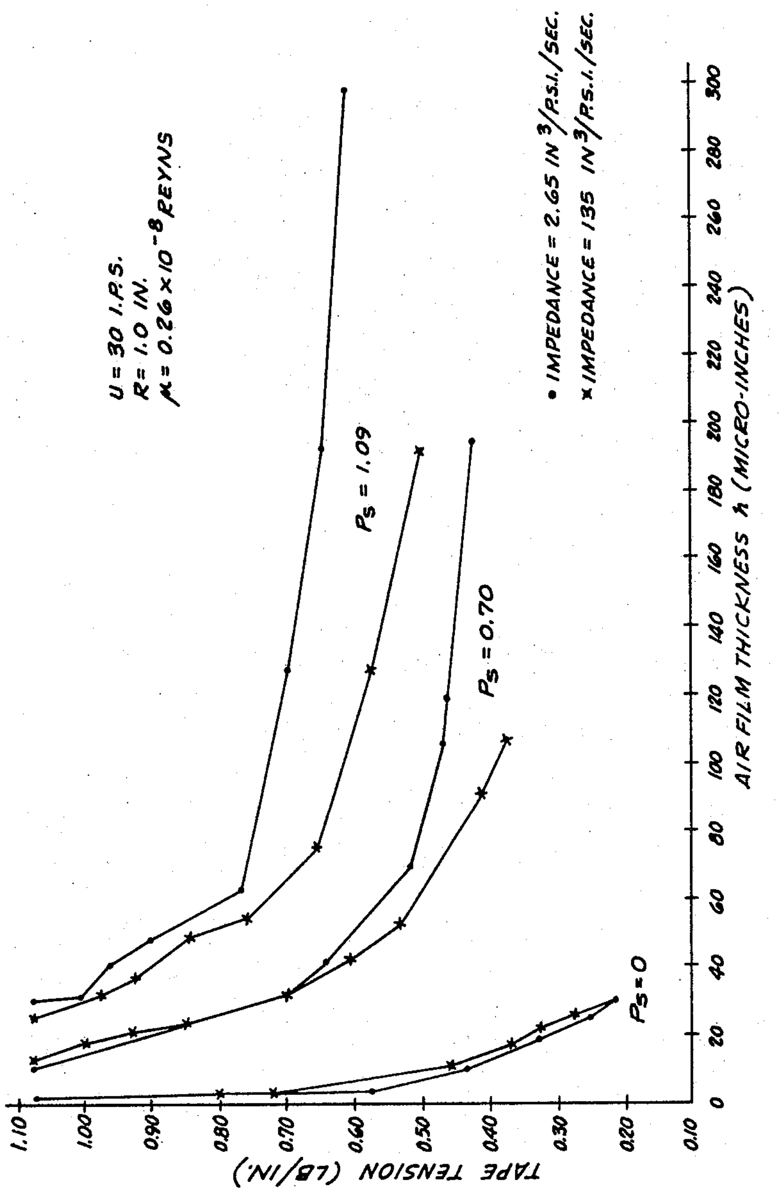
FIGURE 9 is a chart illustrating the operation of the invention.

While the control means shown in FIGURE 1 includes the groove 18, the pressure source 19, and the restrictor 21, the apparatus will operate satisfactorily with either the restrictor and groove alone, or the pressure source and groove alone. Of course, the groove or some equivalent is needed to distribute the effect of the pressure source or restrictor across the width of the tape. However, the restrictor 23 may be entirely dispensed with, as illustrated by the chart of FIGURE 9 showing the operation of an actual head bearing structure both with and without a restrictor. In this example, the impedance of 135 in.$^3$/p.s.i./sec. was provided by a five-inch length of steel tubing having an inside diameter of six mils. Conversely, with a variable restrictor of sufficiently great impedance range, it is clear that control can be effected without the use of a pressure source 22. In such case the pressure $P_S$ is equal to ambient or atmospheric gauge pressure, i.e., zero. Such a variable restrictor may be provided in the form of a valve of a type well known in the art, or by means of a very long length of small-diameter tubing tapped at various points along the length thereof. In practice, however, it has proved to be of some advantage to use both an external pressure source and a restrictor, the pressure source being variable and the restrictor being of fixed impedance value. The advantage of this combination lies in the fact that it is easier to regulate and adjust the performance of the bearing by means of a variable pressure source than by means of a variable restrictor, while at the same time the presence of the fixed impedance imparts a measure of stability to the bearing in respect to variations that may be induced by the ordinary unavoidable flutter variations in tape speed and tension that characterize the majority of tape transport mechanisms. It will be observed in connection with FIGURE 9, for example, that for a given source pressure $P_S$, the curve produced with the use of the restrictor is substantially everywhere of steeper slope than the curve produced without the restrictor. The steeper the slope of the curve, the more nearly is the value of $h$ independent of flutter variations in speed and tension. For example, with a steeper curve, it is clear that a given change of tension plotted as an ordinate on the chart produces a smaller change in $h$ plotted as an abscissa.

Figure 10:
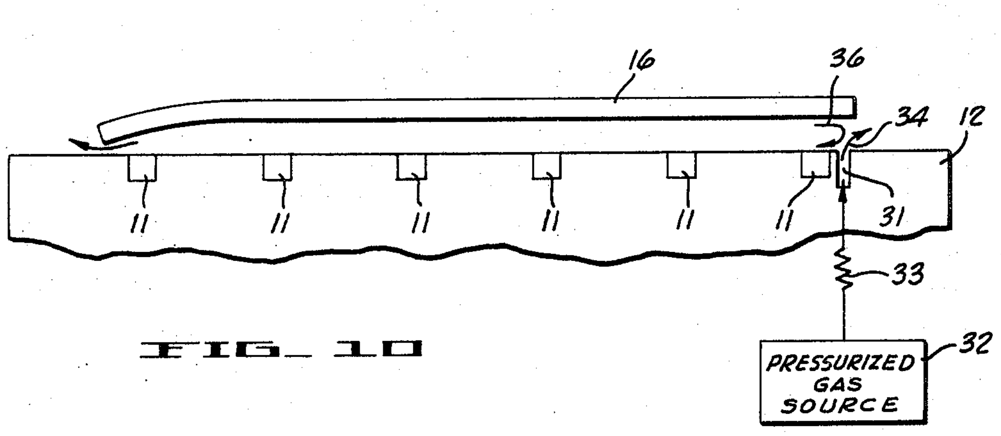
FIGURE 10 is a schematic cross-section taken substantially on the plane of lines 10—10 of FIGURE 1.

As previously mentioned, the spacing $h$ is so small in relation to the width of the tape that lateral leakage has no effect on the spacing over most of the tape width. However at the very edges, there is some collapse of the tape, which is of disadvantage in multi-track use, when at least two heads must be positioned near the tape edges, and as close thereto as possible for most efficient use of the tape, i.e., for mounting the greatest possible number of heads with the maximum amount of shielding across the tape width. As shown on the left side of FIGURE 10, the air escapes and the tape 16 collapses near the edge. Accordingly, the present invention employs an edge groove 31 parallel to the tape length and near the tape edge, fed by a pressure source

32 through a restrictor 33. The source 32 is adjusted to provide a flow of air, represented by arrow 34, to the bearing and out of the lateral gap at the tape edge. This flow 34 is just sufficient in quantity to replace the air, represented by arrow 36, that would otherwise leak out of the air bearing film, so that in effect no air leaks from the bearing film and the tape edge does not curl down.

Figure 11:
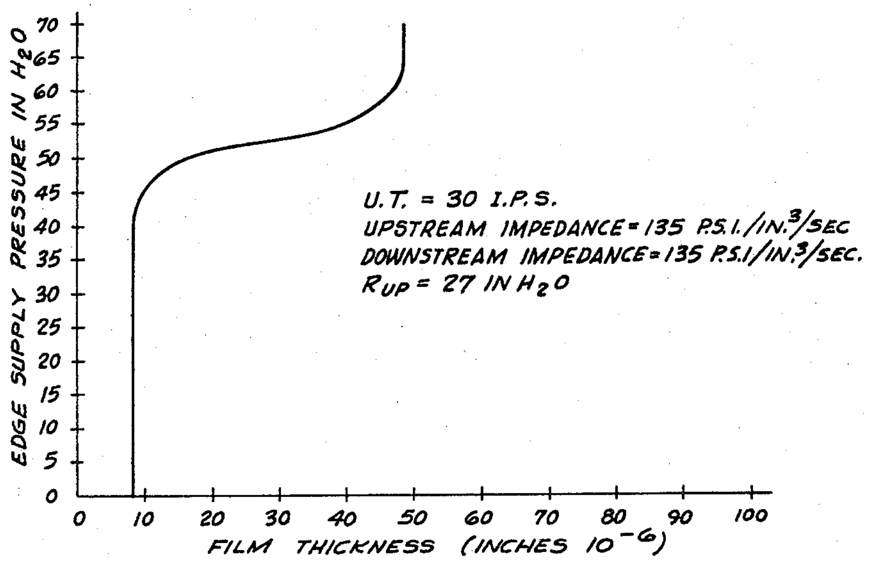
FIGURE 11 is a chart illustrating the operation of the invention.

FIGURE 11 shows the air film thickness measured at the edge head of a seven-head stack with a bearing constructed in accordance with the invention and provided with an edge groove. The average film thickness across the head stack was 50 micro-inches. Consequently it can be seen that the edge of the film becomes equal in thickness to the rest of the film whenever the pressure of the air supply to the edge groove is above a certain minimum value, and precise control of this pressure is unnecessary.

Figure 14:
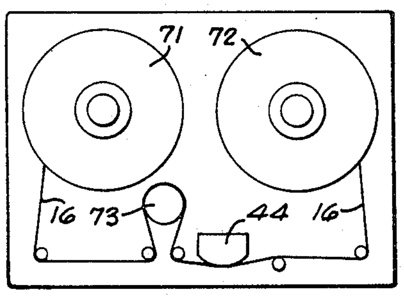
FIGURE 14 is a plan to a reduced scale of a magnetic tape transport incorporating the bearing of FIGURES 12, 13.
Figure 12:
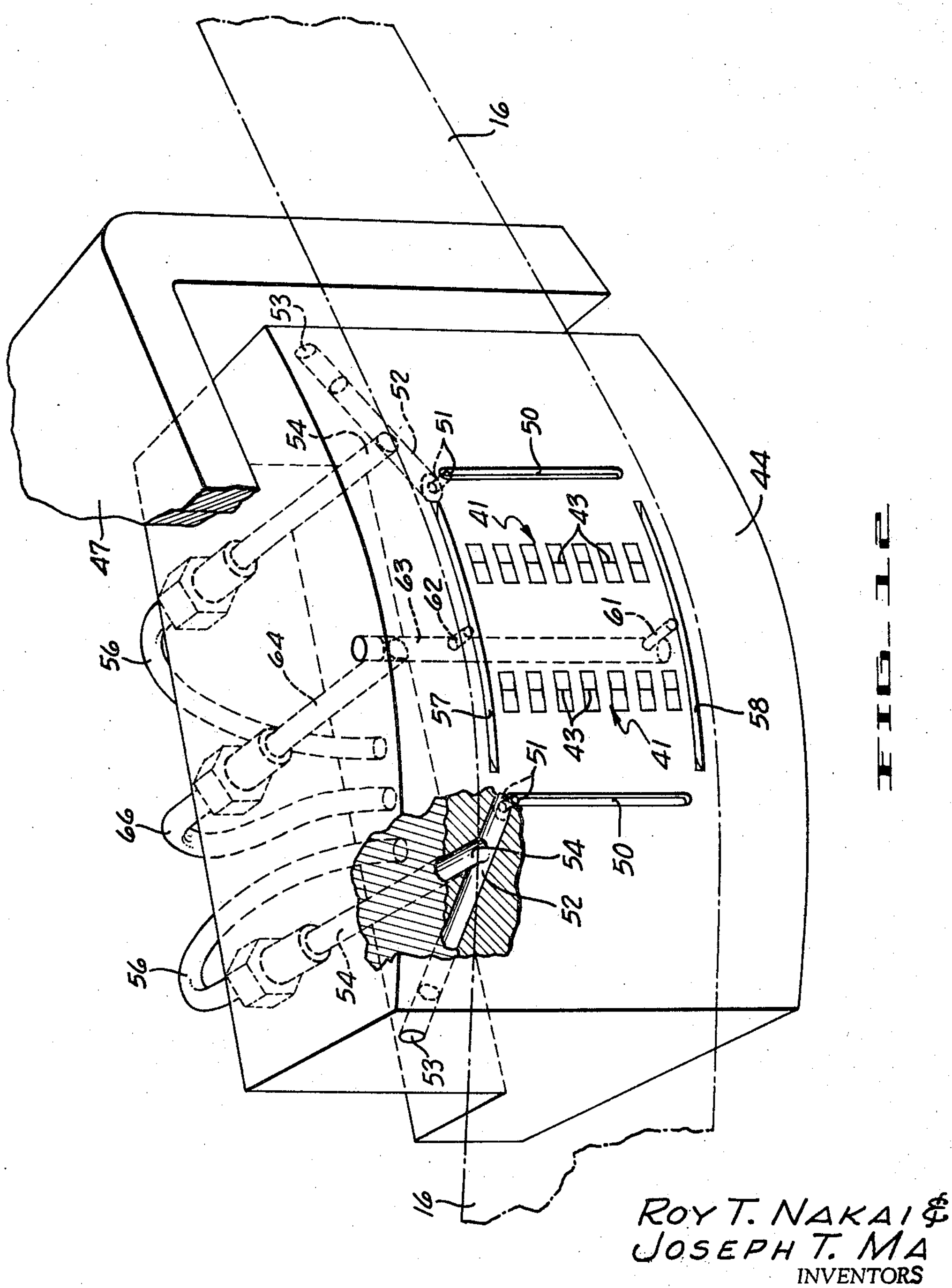
FIGURE 12 is a perspective of a bearing constructed in accordance with the invention.
Figure 13:
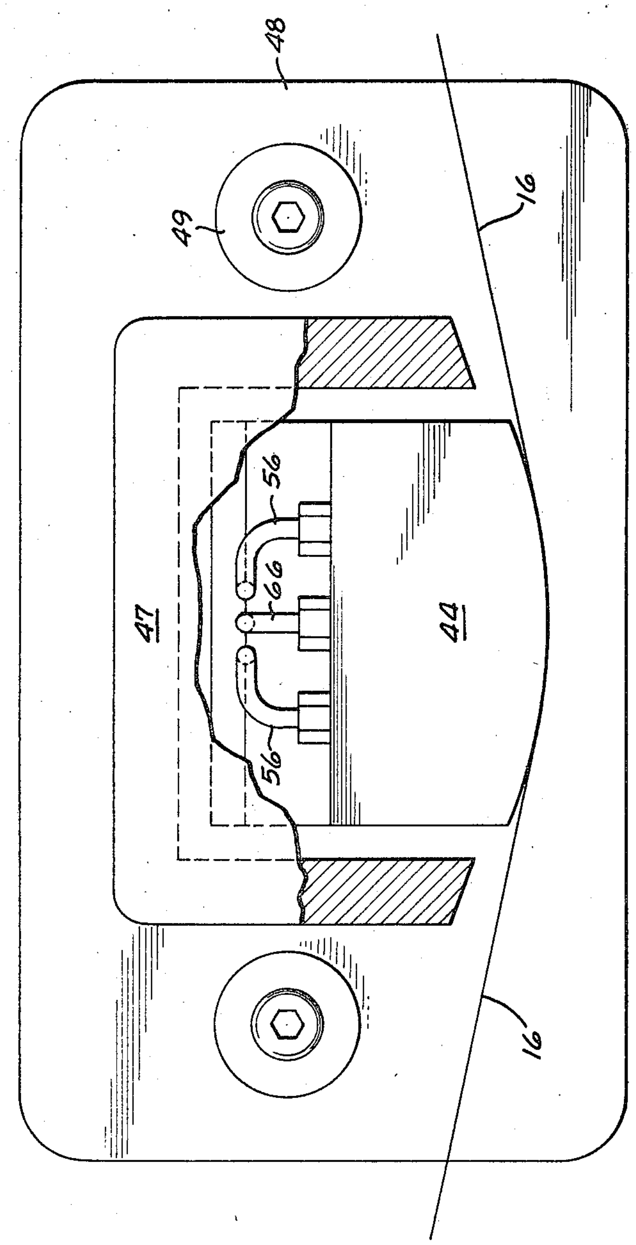
FIGURE 13 is a plan view of the bearing of FIGURE 12.

An actual transducing apparatus built and operated in accordance with the invention is shown in FIGURES 12–14. The transducer has two head stacks 41 and 42, each including seven heads 43 for use on seven tracks of the tape 16. The heads are mounted in a block 44 having a curved face 46, and the block is mounted within a shield 47, the whole being mounted on a base plate 48, which is mounted on the top plate of a transport by means of bolts 49. In the use intended, the tape is operated for recording and reproducing in both forward and reverse directions. Accordingly, two grooves 50 are provided transverse to the direction of movement, so that in either direction, one of the grooves 50 is upstream from the heads 43. In either direction, the downstream groove has no effect on the air film thickness at the heads 43. The grooves 50 are each fed by respective interior channels 51, 52 (one end of which is sealed by a plug 53) and 54, and by exterior conduits 56, which communicate with appropriate restrictors and a pressure source, not shown. A pair of edge grooves 57, 58 are also provided and are fed by interior channels 61, 62, 63 and 64, and by an exterior conduit 66 communicating with an appropriate restrictor and pressure source, not shown. The grooves 50 and 57, 58 in this example are approximately 6 mils wide. FIGURE 14 shows the mounting of the appartus in a magnetic tape transport, including reels 71, 72 and a capstan and pinch roller assembly 73 by which the tape is tensioned in a manner known in the art.

While the invention has been described in relation to a bearing for a moving foil and stationary rigid bearing member, it will be understood that the principles herein disclosed may equally well be applied to a bearing in which the foil is stationary and the rigid bearing member is moving, such as for example, a foil bearing for a rotating shaft. It will also be understood that fluids other than air may be used, and that the concavity 18 may be variously formed, and may for example be defined by a re-entrant portion of the surface 14 together with a pair of flanges extending from the block 12 and closely bracketing the tape edges.

Thus there has been described a bearing having air passages opening in the bearing surface at a point upstream from the transducer head gap in relation to the direction of tape motion, and means coupled to the passages for controlling the flow of air beneath the tape at the openings. Such means may take the form of an external pressure source or a restrictor in the passage, used either separately or in combination.

What is claimed is:

1. In a magnetic tape transducing apparatus of the type in which tape is tensioned around the curved surface of a head so as to define a zone of wrap having a magnetic transducing gap inset therein and said tape is moved around said curved surface in an upstream-to-downstream direction, the combination comprising:

a recess formed in said surface entirely within said zone and upstream from said transducing gap and entirely beneath said tape; and a fluid pressure source coupled to said recess and cooperating therewith to control the flow of said fluid upstream from said transducing gap to control the spacing of said tape from said gap.

2. In a magnetic tape transducing apparatus of the type in which tape is tensioned around the curved surface of a head so as to define a zone of wrap having a magnetic transducing gap inset therein and said tape is moved around said surface so as to establish a pressurized air film flowing in an upstream-to-downstream direction and spacing said tape from said gap, the combination comprising:

a recess formed in said surface entirely within said zone and entirely beneath said tape and upstream from said transducing gap; and a pressurized air source coupled to said recess and cooperating therewith to control the flow of said air upstream from said transducing gap to control the thickness of said film at said gap;

said pressurized air source being arranged to provide air at a pressure such that the pressure in said film at said recess is greater than the pressure in said film at said gap.

3. In a magnetic tape transducing apparatus of the type in which tape is tensioned around the curved surface of a head so as to define a zone of wrap having a magnetic transducing gap inset therein and said tape is moved around said surface so as to establish an air film flowing in an upstream-to-downstream direction and spacing said tape from said gap, the combination comprising:

a recess formed in said surface entirely within said zone and entirely beneath said tape and upstream from said transducing gap, said recess substantially traversing the width of said tape but having a dimension less than said width; and an air pressure source coupled to said recess and cooperating therewith to control the flow of said air upstream from said transducing gap to control the thickness of said film at said gap.

4. In a magnetic tape transducing apparatus of the type in which tape is tensioned around the curved surface of a head so as to define a zone of wrap having a magnetic transducing gap inset therein and said tape is moved around said surface so as to establish an air film flowing in an upstream-to-downstream direction and spacing said tape from said gap, the combination comprising:

a recess formed in said surface entirely within said zone and entirely beneath said tape and upstream from said transducing gap, said recess substantially traversing the width of said tape but having a dimension less than said width;

a restrictor coupled to said recess and communicating therewith; and an air pressure source coupled to said restrictor and communicating therethrough with said recess to control the flow of said air upstream from said transducing gap to control the thickness of said film at said gap.

5. In a magnetic tape transducing apparatus of the type in which said tape is tensioned around the curved surface of a head so as to define a zone of wrap having a magnetic transducing gap inset therein and said tape is moved around said surface and is spaced from said surface by a fluid film flowing in an upstream-to-downstream direction, the combination comprising:

a recess formed in said surface entirely within said zone and upstream from said transducing gap and entirely beneath said tape;

a fluid pressure source coupled to said recess and cooperating therewith to control the flow of said fluid upstream from said transducing gap to control the thickness of said film at said gap; and means for delivering a flow of pressurized fluid to the two regions between said surface and the edge portions of said tape, at least in the vicinity of said gap, to counteract the lateral leakage of fluid from said film.

6. In a magnetic tape transducing apparatus of the type in which said tape is tensioned around the curved surface of a head so as to define a zone of wrap having a magnetic transducing gap inset therein and said tape is moved around said surface by a fluid film flowing in an upstream-to-downstream direction, the combination comprising:

a recess formed in said surface entirely within said zone and upstream from said transducing gap and entirely beneath said tape;

a fluid pressure source coupled to said recess and cooperating therewith to control the flow of said fluid upstream from said transducing gap to control the thickness of said film at said gap;

a pair of grooves formed in said surface parallel to and positioned beneath the edge portions of said tape and bracketing said gap; and means for delivering a flow of pressurized fluid to said grooves to counteract the lateral leakage of fluid from said film.

7. In a magnetic tape transducing apparatus of the type in which said tape is tensioned around the curved surface of a head so as to define a zone of wrap having a magnetic transducing gap inset therein and said tape is moved around said surface and is spaced from said surface by a fluid film flowing in an upstream-to-downstream direction, the combination comprising:

a pair of grooves formed in said surface entirely within said zone and parallel to and positioned beneath the edge portions of said tape and bracketing said gap; and means for delivering a flow of pressurized fluid to said grooves to counteract the lateral leakage of fluid from said film.

8. In a magnetic tape transducing apparatus of the type in which tape is tensioned around the curved surface of a head so as to define a zone of wrap having at least one magnetic transducing gap inset therein and said tape is moved in forward and reverse directions around said surface so as to establish an air film flowing in an upstream-to-downstream direction and spacing said tape from said gap, the combination comprising:

a pair of recesses formed in said surface entirely within said zone and entirely beneath said tape, one of said recesses being upstream from said transducing gap in said forward direction of tape motion, and the other of said recesses being upstream from said gap in said reverse direction of tape motion, each of said recesses substantially traversing the width of said tape but having a dimension less than said width;

a restrictor coupled to each of said recesses and communicating therewith;

a pressurized air source coupled to said restrictors and communicating therethrough with said recesses, said air source being adjustable to deliver a selected pressure for controlling the flow of said air in said film upstream from said gap in both of said directions of tape motion and for thereby controlling the thickness of said film in the vicinity of said gap;

said pressurized air source being arranged to provide air at a pressure such that the pressure in said film at said recesses is greater than the pressure in said film at said gap;

said surface also being formed with a pair of grooves parallel to and positioned beneath the edge portions of said tape and bracketing said gap; and means for delivering a flow of pressurized air to said grooves to counteract the lateral leakage of air from said film.

References Cited

UNITED STATES PATENTS 3,151,796 10/1964 Lipschutz ---------- 179—100.2
3,170,045 3/1965 Baumeister et al. -- 179—100.2
3,219,990 11/1965 Goehle ----------- 340—174.1
3,319,238 5/1967 Jacoby ----------- 340—174.1

BERNARD KONICK, *Primary Examiner.*
VINCENT P. CANNEY, *Assistant Examiner.*

U.S. Cl. X.R.

179—100.2